United States Patent [19]

Ripert

[11] 4,260,134
[45] Apr. 7, 1981

[54] SKIRTED HUB WITH FULL PENETRATION BUTT WELD TO BODY

[75] Inventor: Roger L. Ripert, Concord, Calif.

[73] Assignee: Grove Valve and Regulator Company, Oakland, Calif.

[21] Appl. No.: 910,623

[22] Filed: May 30, 1978

[51] Int. Cl.³ .............................................. F16K 3/00
[52] U.S. Cl. ................................ 251/367; 29/157.1 R; 251/329
[58] Field of Search ................... 29/157.1 R; 228/169, 228/170, 184; 251/367, 326, 329

[56] References Cited

U.S. PATENT DOCUMENTS

| | | | |
|---|---|---|---|
| 1,828,478 | 10/1931 | Sparks | 251/329 |
| 2,065,628 | 12/1936 | Taylor et al. | 29/157.1 R |
| 2,869,574 | 1/1959 | Volpin | 29/157.1 R |
| 3,197,175 | 7/1965 | Siepmann | 251/329 |
| 3,732,885 | 5/1973 | Allen | 251/367 |
| 3,777,342 | 12/1973 | Allen | 29/157.1 R |

FOREIGN PATENT DOCUMENTS

| | | | |
|---|---|---|---|
| 246871 | 9/1963 | Australia | 251/329 |
| 896584 | 10/1953 | Fed. Rep. of Germany | 251/367 |
| 967046 | 10/1950 | France | 251/329 |
| 1338975 | 10/1963 | France | 251/329 |
| 91998 | 8/1959 | Netherlands | 251/367 |

*Primary Examiner*—Martin P. Schwadron
*Assistant Examiner*—A. Michael Chambers
*Attorney, Agent, or Firm*—Melvin R. Stidham

[57] ABSTRACT

In a valve structure wherein a cylindrical hub extends through a circular opening in the valve body into the interior, the metal around the opening is swaged outward to form a generally cylindrical weld joint portion and the hub has a skirt around it with an annular edge which is disposed adjacent to and aligned with the annular end of the swaged joint portion. A full penetration butt weld between the two annular edges secures the hub in place.

3 Claims, 3 Drawing Figures

FIG-1-

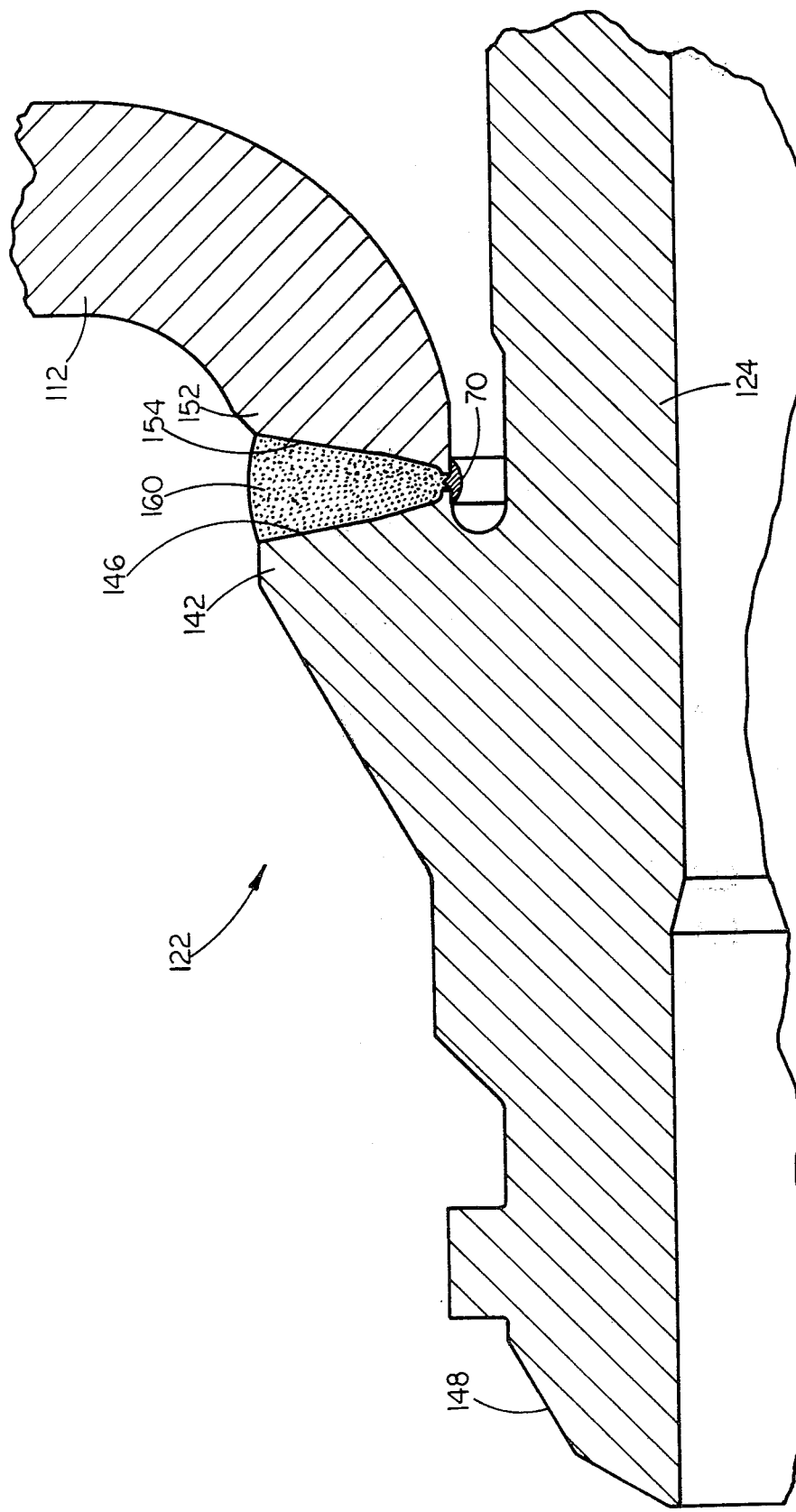

SKIRTED HUB WITH FULL PENETRATION BUTT WELD TO BODY

BACKGROUND OF THE INVENTION

In valves fabricated from steel plate or the like, it is common to have cylindrical hubs which extend into the valve body to carry valve sealing means at their inner ends. In the case of cylindrical hubs on a cylindrical body, the intersection of the two cylinders, along which the weld is deposited, traverses several planes, making it difficult to deposit the weld with automatic welding equipment. In a previous solution to the problem, the metal around the valve opening was swaged outward to form a generally cylindrical hub portion having an annular outer edge disposed along a single plane normal to the axis of the hub. Then, a weld could be deposited by moving a welding head in a planar orbit around the hub (or rotating the valve about the hub axis) to deposit a weld on the outer cylindrical surface of the hub and against the annular edge of the swaged portion. This has proved satisfactory, but a superior joint can be achieved by a full depth butt weld between two adjacent annular surface, particularly to avoid shear stresses in the weld under pipeline loads. Accordingly, in another embodiment an outer hub extension was butt welded to the annular end of the swaged hub portion. However, this required that an inner hub extension be welded to the inside wall of the valve body to form a carrier for the valve sealing means.

OBJECTS OF THE INVENTION

It is an object of this invention to provide a generally cylindrical hub portion which extends from an outer end for pipeline connection to an inner end within the interior of the valve body with means for effecting a full penetration butt weld connection to the body.

It is a further object of this invention to provide a cylindrical hub, which extends into the interior of the valve body, with means for transmitting pipeline loads directly to the body.

Other objects and advantages of this invention will become apparent from the description to follow, particularly when read in conjunction with the accompanying drawings.

SUMMARY OF THE INVENTION

In carrying out this invention, there is provided a generally cylindrical hub which is of a length to extend from an end for pipeline connection through a circular opening in the valve body and into the interior for carrying seat rings and the like. The metal around the body opening is swaged outward to form a cyindrical weld joint portion terminating in an annular edge which is disposed along a plane normal to its axis. A skirt is formed integrally with and around the hub to terminate in an annular edge concentric thereto so that when the hub is received in the swaged opening, the annular edges of the skirt and the swaged body portion are in closely spaced alignment. Then, a full penetration butt weld between the annular edges secures the hub in place, whereby pipeline loads transmitted along the hub are transferred directly to the body through the skirt. The skirt and hub may be formed as a one-piece casting or by fabricating a pair of steel cylindrical members. After flaring one end of one cylinder outward into a bell section the other member is nested into it and welded to its inner surface so that the end of the bell section forms the skirt.

BRIEF DESCRIPTION OF THE DRAWING

In the drawings:

FIG. 3 is an enlarged partial section view of a body-hub joint showing another embodiment of this invention.

DESCRIPTION OF PREFERRED EMBODIMENT

Figure 1:
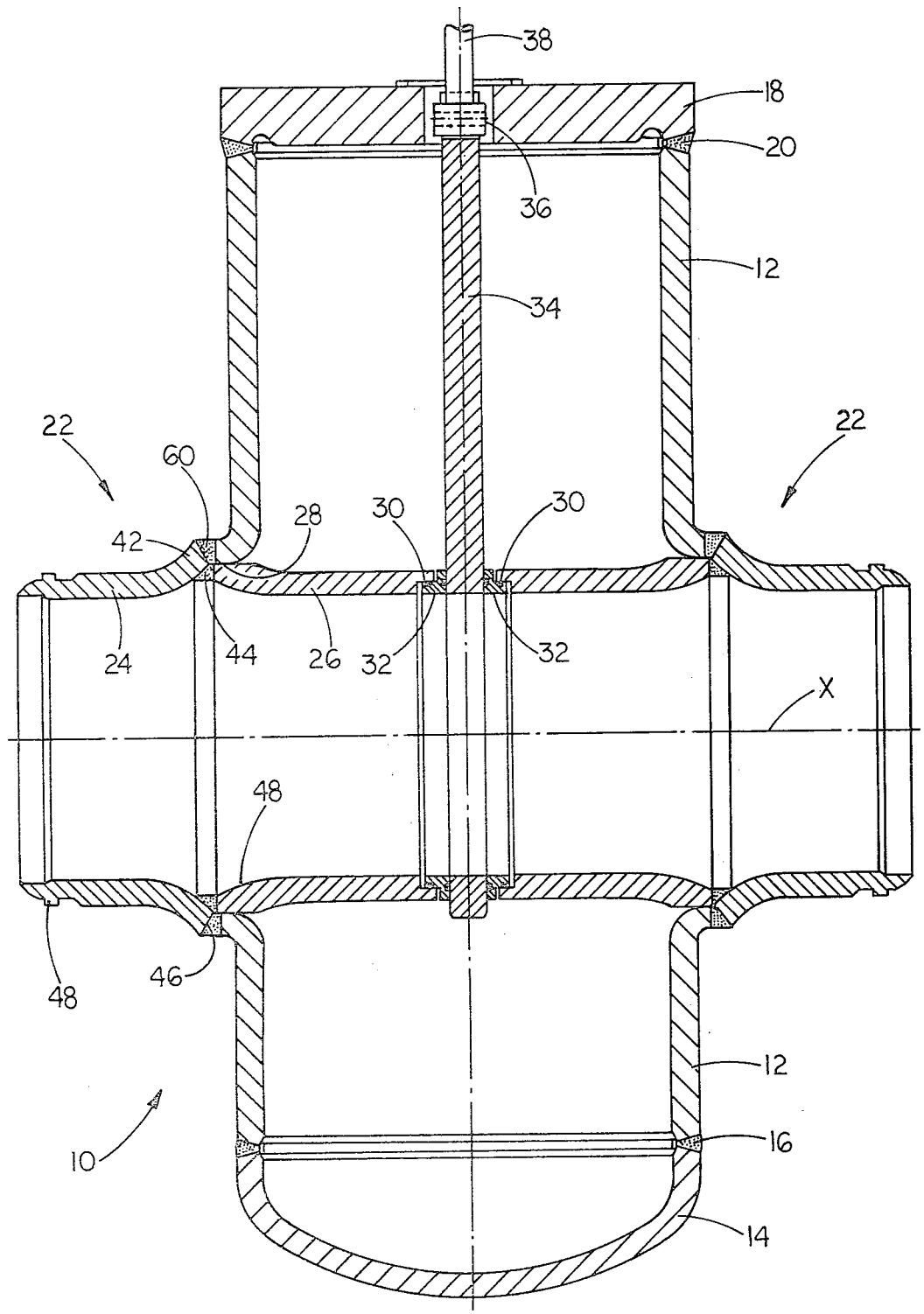
FIG. 1 is a vertical section view of a gate valve embodying features of this invention.
Figure 2:
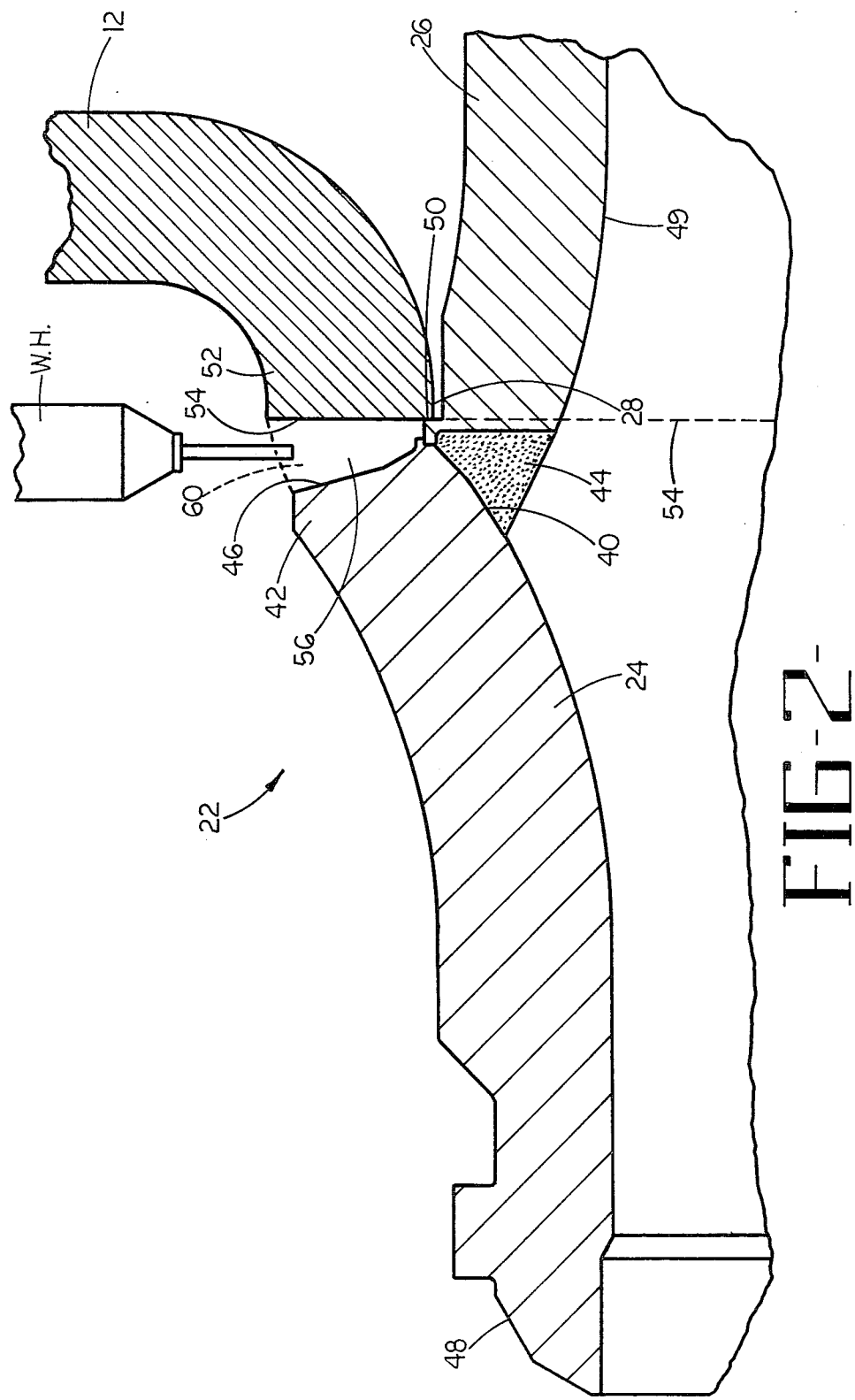
FIG. 2 is an enlarged partial section view of a body-hub welded joint.

The Embodiments of FIGS. 1 and 2

Referring now to FIG. 1 with greater particularity, the gate valve 10 of this invention includes a cylindrical valve body 12 having a dished bottom closure 14 welded thereto at 16. The top closure 18 may be a planar circular member of relatively thick plate secured to the body 12 by a full penetration weld 20.

Generally cylindrical hubs 22, which may be made up of outer and inner sections 24 and 26, extend through openings 28 in the valve body 12 into the interior thereof. Recesses 30, are formed at the inner ends of the hubs 22 for accommodation of seat rings 32 for sealing engagement with a gate 34. The gate 34 is secured by any suitable means 36 to the lower end of a stem 38 which is raised and lowered by conventional valve actuator means (not shown).

In preparing the hubs 22 for mounting in the body, the outer sections 24 are flared outward at 40 to form a bell section 42 (FIG. 2) into which the inner hub section 26 is inserted and welded at 44. It will be seen that the bell section 42 is in the nature of a skirt around the hub 22 presenting an annular end surface 46.

Before the hub sections 24 and 26 are welded together, the outer section 24 is preferably formed for connection into the pipeline (not shown) as by machining it at 48 for a weld connection. Similarly, the inner section may be flared slightly at 49 to provide a smoother transition with the outer section 24 and it may be provided with a shoulder 50 to facilitate placement for welding, as will be described.

In the meantime, the metal of the valve body 12 around the circular opening 28 is swaged outward, as described in co-pending application Ser. No. 856,314 filed Dec. 1, 1977 for "Method of Forming a Valve Body" now abandoned. As there described, the opening 28 is initially formed as an oval opening to compensate for the curvature of the valve body so that when the swaging is complete there will be an integral cylindrical extension 52 or weld joint portion on the valve body, having an annular end 54, which after cutting or burning if necessary, is disposed along a single plane. Then the hub sections 24 and 26, as so welded together, are inserted as a unit, with the shoulder 50 disposed against the annular face 54 of the cylindrical swaged portion 52.

The Embodiment of FIG. 3.

In this embodiment, the hub 122 is cast with the skirt portion 142 as an integral part of the inwardly extending hub sleeve 124. After the sleeve is finished at 148 for the pipeline weld connection and at 30 (FIG. 1) for seat ring accommodation, the hub is positioned on the body 112 and temporarily held in place by tack welding a backup ring 70 across the gap between the annular surfaces 146 and 154. Then the full penetration butt weld 160 is deposited on the backup ring and between the edges 146 and 154.

In both embodiments, the skirt 42 and 142 provides a superior full penetration butt weld and, in addition, transmits pipeline forces, as for example, as a result of thermal expansion and contraction, through the weld 60 or 160 directly to the body 12 or 112. The stresses in the weld are compressive or tensile and not shear.

While this invention has been described in conjunction with preferred embodiments thereof, it is obvious that modifications and changes therein may be made without departing from the spirit and scope of this invention as defined by the claims appended hereto.

What is claimed as invention is:

1. In a valve structure comprising:
   a body member having a circular opening therein; and
   a generally cylindrical hub member extending through said opening; wherein said hub member comprises an outer portion which is flared outward at its inner end into a bell section; a generally cylindrical inner portion nested within said bell section and welded to the inner surface of said outer portion; the inner end of said bell section forming a skirt;
   the improvement comprising:
   an integral, cylindrical weld joint portion on said body member around said opening forming an annular end coaxial therewith, lying substantially along a single plane outward of said body member;
   said skirt on and around said hub member presenting an annular edge concentric thereto disposed toward and adjacent said annular end; and
   a weld around and between said annular edge and said annular end unitizing same so that pipeline loads on said hub member are transmitted through said skirt to said body member;
   there being no reduction from inner pipeline diameter of said hub member from end to end and said hub member having means on the outer end thereof adapting it for connection into a pipeline and means on the inner end conditioned to receive a seal ring.

2. The valve structure defined by claim 1 wherein:
   said body section is fabricated from plate metal; and
   said joint portion is swaged out around said circular opening to form said annular end of substantially the thickness of said body section.

3. The valve structure defined by claim 1 wherein:
   said weld is of substantially the full thickness of said annular end.

* * * * *